United States Patent
Griesenbruch

(10) Patent No.: US 8,256,694 B2
(45) Date of Patent: Sep. 4, 2012

(54) SPRAY-GUN LINE-CONNECTING DEVICE

(76) Inventor: Ulrich Griesenbruch, Heusenstamm (DE)

( * ) Notice: Subject to any disclaimer, the term of this patent is extended or adjusted under 35 U.S.C. 154(b) by 462 days.

(21) Appl. No.: 12/532,997

(22) PCT Filed: Mar. 17, 2008

(86) PCT No.: PCT/EP2008/053179
§ 371 (c)(1),
(2), (4) Date: Sep. 24, 2009

(87) PCT Pub. No.: WO2008/116778
PCT Pub. Date: Oct. 2, 2008

(65) Prior Publication Data
US 2010/0116914 A1   May 13, 2010

(30) Foreign Application Priority Data
Mar. 24, 2007   (DE) .................... 10 2007 014 216

(51) Int. Cl.
*B05B 7/02* (2006.01)
(52) U.S. Cl. ........ 239/526; 239/303; 239/525; 239/290; 901/43; 118/302
(58) Field of Classification Search .......... 239/303–305, 239/525, 290, 296, 526, 587.1; 901/43; 118/302, 118/323
See application file for complete search history.

(56) References Cited

U.S. PATENT DOCUMENTS

| 5,887,800 | A * | 3/1999 | McClosky ................. 239/587.1 |
| 6,164,561 | A * | 12/2000 | Yoshida et al. ................. 901/43 |
| 6,338,441 | B1 * | 1/2002 | Umezawa et al. .............. 901/43 |
| 6,702,893 | B2 * | 3/2004 | Thome et al. ................. 118/302 |
| 6,742,722 | B2 * | 6/2004 | Hosoda et al. ................ 239/305 |
| 2003/0042339 | A1 | 3/2003 | Dankert |
| 2005/0274317 | A1 | 12/2005 | de Leeuw et al. |

FOREIGN PATENT DOCUMENTS

| DE | 19914040 | 10/2000 |
| DE | 202004007024UA | 7/2004 |
| DE | 102004047923 | 4/2006 |
| EP | 1287901 | 3/2003 |

OTHER PUBLICATIONS

PCT International Search Report and Written Opinion for PCT/EP2008/053179, mailed Mar. 24, 2007.

* cited by examiner

Primary Examiner — Steven J Ganey
(74) Attorney, Agent, or Firm — Fletcher Yoder, P.C.

(57) ABSTRACT

A spray-gun line-connecting device is provided for the connection of a plurality of lines between a robotic arm and a spray device. The spray-gun line-connecting device may provide a plurality of cylindrical connection joints at an interface between mating surfaces. For example, the lines may include enlarged cylindrical heads, which fit within cylindrical receptacles in a first mating surface. A second mating surface may extend over the first mating surface, and include passages aligned with the lines.

19 Claims, 3 Drawing Sheets

SPRAY-GUN LINE-CONNECTING DEVICE

Figure 1:
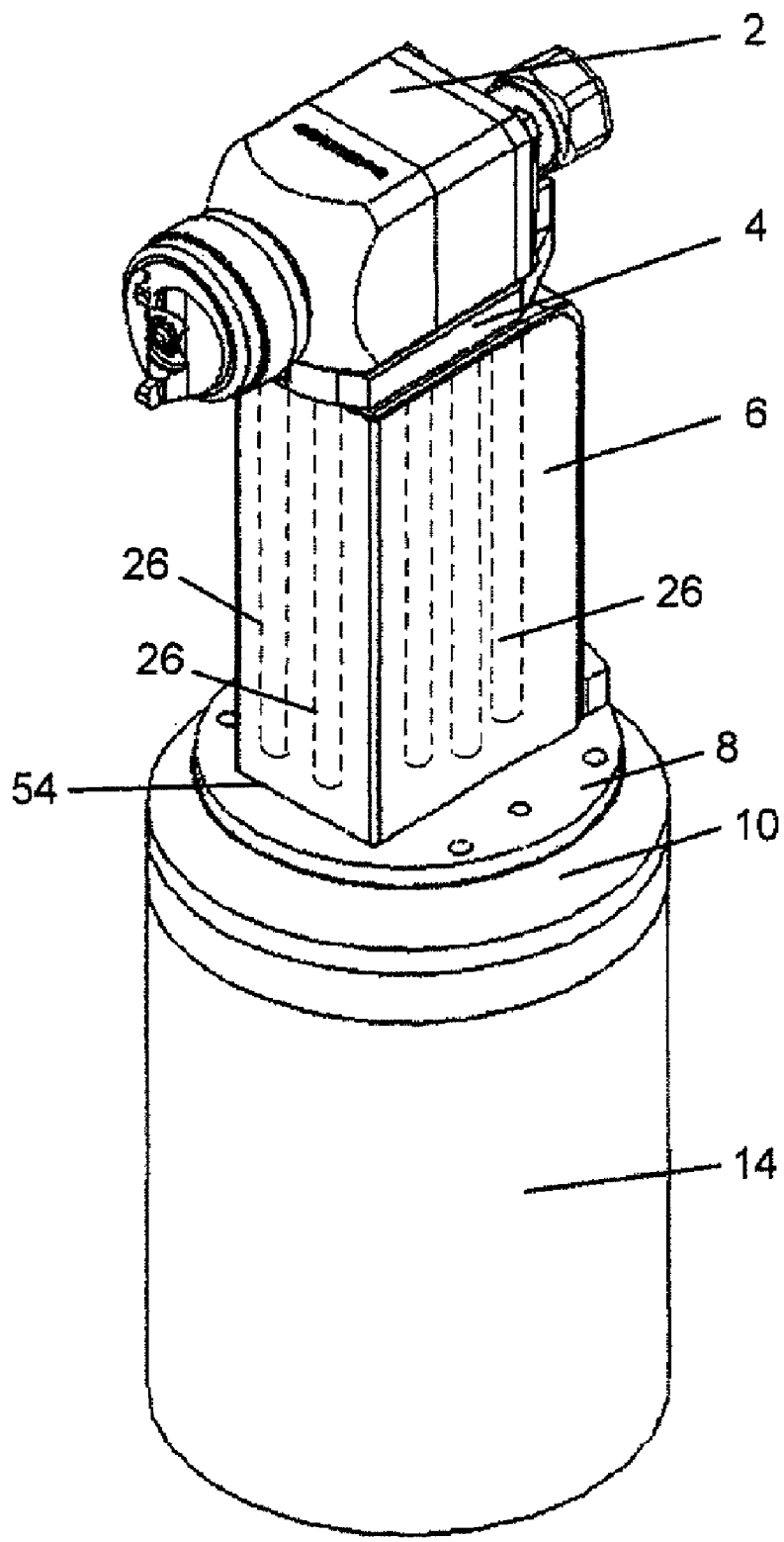

This application claims priority to PCT Application No. PCT/EP2008/053179 entitled "Spray-Gun Line-Connecting Device", filed on Mar. 17, 2008, which is herein incorporated by reference in its entirety, and which claims priority to German Patent Application No. DE 10 2007 014 216.3, entitled "Spray-Gun Line-Connecting Device", filed on Mar. 24, 2007, which is herein incorporated by reference in its entirety.

BACKGROUND

The invention relates to a spray-gun line-connecting device.

Spray guns of this type are used for spray-coating articles with liquid paint or liquid lacquer.

Spray guns of this type are known, for example, from EP 1 287 901 B1.

BRIEF DESCRIPTION

The invention is intended to achieve the object of improving the line-connecting device between a robot arm and at least one spray gun held by the robot arm.

According to the invention, a perforated plate can achieve the following advantages: good protection of the tube connecting sockets against mechanical damage and dirt; inexpensive and good sealing, preferably by means of O rings, on the rear and front sides of the perforated plate for supplying liquid paint or liquid lacquer and one or more airflows from the bundle of tubes in the robot arm to at least one spray gun held by the robot arm.

The dependent claims contain further features of the invention.

Exact positioning of the seals is achieved in a simple manner by arranging, according to the invention, seals in depressions, e.g. annular grooves or bore steps, in the perforated plate.

The fastening of the perforated plate to a robot flange or to the robot arm, according to the invention, prevents the perforated plate from being lost even when no spray gun is fastened to the robot arm.

A spray gun or an intermediate element, which can be used to connect one or more spray guns to the robot arm, may be fastened to the robot arm, to the robot flange or to the perforated plate depending on the expediency in the practical use of the invention.

According to one particular embodiment of the invention, the socket collars of tube connecting sockets are provided with a circular outer circumference rather than with a polygonal, for example hexagonal, outer circumference, as is the case in the prior art. Smaller distances are thereby possible between the flange holes and therefore also between the tubes. The circular shape of the socket collars makes it easier to install and remove the tubes since the radially protruding socket collars can be positioned in any desired direction of rotation without colliding with adjacent socket collars. This also makes it possible to use larger dimensional tolerances.

DRAWINGS

Figure 2:
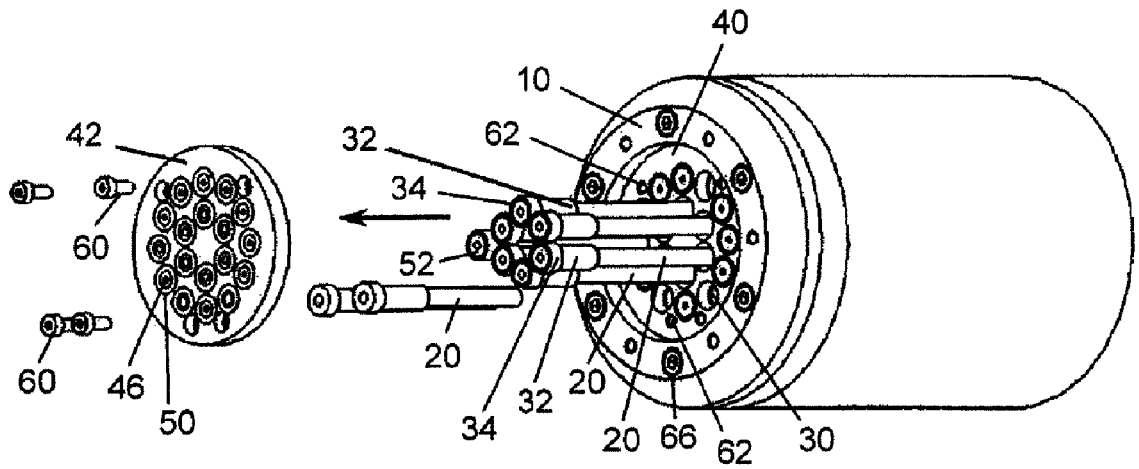
Figure 3:
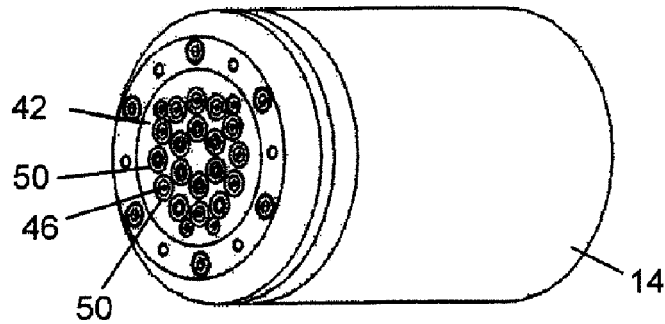
Figure 4:
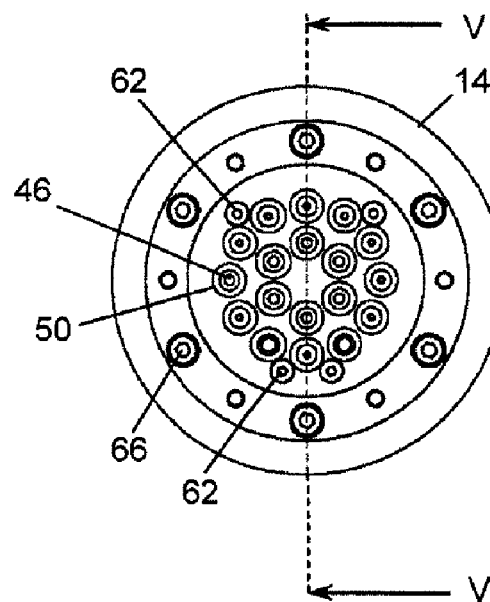
Figure 5:
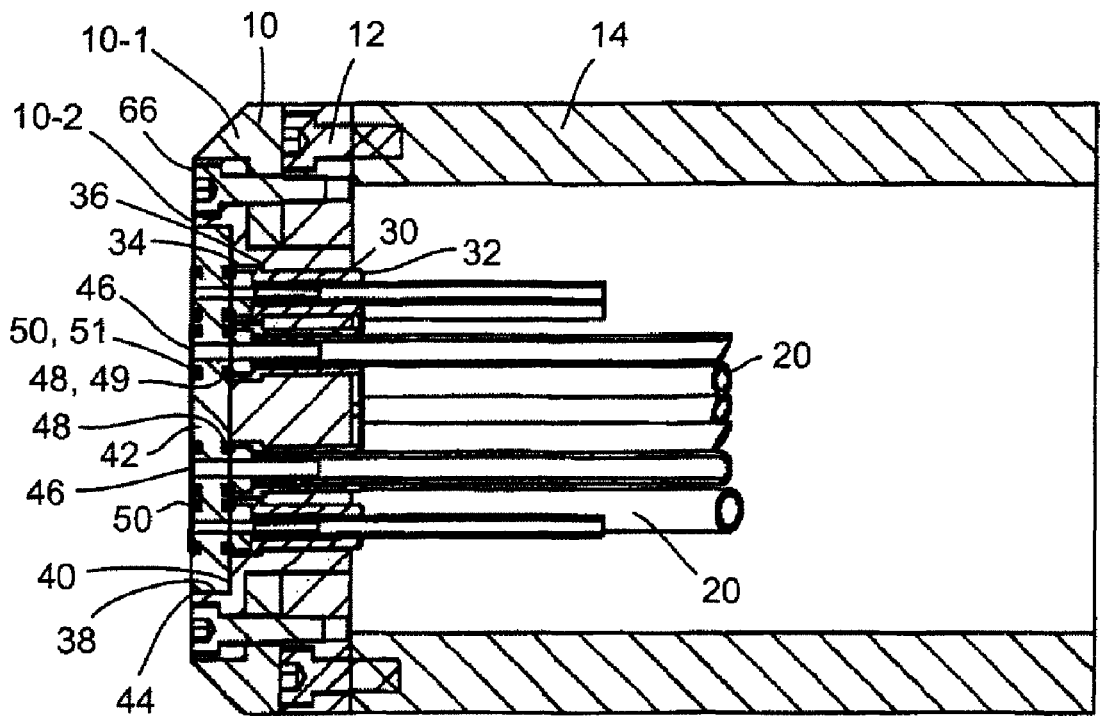
Figure 6:
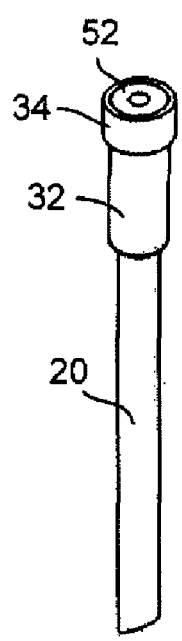

In the text which follows, the invention is described with reference to the appended drawings and on the basis of a preferred embodiment as an example. In the drawings:

FIG. 1 shows a perspective illustration of an automatic spray gun which is fastened to a robot arm, FIG. 2 shows a perspective exploded illustration of the end portion of the robot arm with a bundle of tubes, which extends out from said end portion, and a perforated plate, FIG. 3 shows a perspective view of the front end of the robot arm with the perforated plate which is fastened thereto and covers the ends of the tubes which have been pushed back into the robot arm, FIG. 4 shows a view of the front end of the robot arm shown in FIG. 3, FIG. 5 shows a cut-off longitudinal section of the robot arm in the radial plane V-V from FIG. 4, and FIG. 6 shows an end portion of a tube shown in FIG. 2 having a tube connecting socket which is pushed onto said end portion and is connected to the tube, for example is clamped to the tube.

DETAILED DESCRIPTION

FIG. 1 shows an automatic spray gun 2 for spray-coating articles with liquid paint or lacquer. The spray gun 2 is fastened to an adaptor 6 via an intermediate plate 4, said adaptor having an adaptor flange 8. Screws (not shown) are used to fasten the adaptor flange 8 to a robot flange 10 which may have one or more parts and is fastened to a tubular end portion of a robot arm 14 by means of screws 12. A multiplicity of tubes 20 which extend through the robot arm 14 are required in order to supply the spray gun with liquid paint or liquid lacquer and with one or more airflows, for example an airflow for spraying the paint or the lacquer and/or an airflow for shaping the sprayed jet of liquid and/or an airflow for actuating a valve which controls the paint or the lacquer.

According to the invention, a new device is provided for the connection of the multiplicity of tubes 20 to the end of the tubular robot arm 14 with bores 26 in the adaptor 6. The adaptor 6 is an intermediate element in a mechanical connection which, in the embodiment shown, comprises the adaptor 6 and the intermediate plate 4. According to another embodiment, only a single intermediate element could be provided instead of the adaptor 6 and the intermediate plate 4 or both the intermediate plate 4 and the adaptor 6 could be omitted and the spray gun 2 could be fastened directly to the robot flange 10; in the latter case, a housing of the spray gun 2 itself is used as the intermediate element between the tubes 20 of the robot arm 14 and the internal lines of the spray gun 2.

FIGS. 2 to 5 show that the robot flange 10 is provided with a multiplicity of flange holes 30, in each of which there is inserted a tube connecting socket 32, which is respectively pushed together with the end of one of the tubes 20 and respectively lies with a radially protruding socket collar 34 against the front flange face 36. FIG. 5, in particular, shows that the robot flange 10 may be formed from a plurality of parts and may have, for example, a single-part or multi-part flange ring 10-1 and a flange plate 10-2 which is fastened to the flange ring 10-1 and arranged centrally with respect thereto. The flange holes 30 are formed in the flange plate 10-2 and the front flange face 36, against which the protruding socket collars 34 lie, is in each case a forwardly pointing bore step of a bore extension of the flange holes 30. The protruding socket collars 34 of the tube connecting sockets 32 are each completely recessed into the bore extension at the end of the flange holes 30.

The forwardly pointing end side of the flange plate 10 is provided with a depression 38 which is preferably cylindrical and has a forwardly pointing bottom face 40. The socket collars 34 are recessed into the bottom face 40 such that they do not protrude forward out of the bottom face but rather preferably end in line with it.

According to the invention, a perforated plate 42 is arranged in the depression 38 and is preferably in line with the forwardly pointing end face 44 of the flange plate 10-2 in the radial direction.

The perforated plate 42 extends radially over the socket collars 34 of all the tube connecting sockets 32. A multiplicity of through-holes 46 are formed in the perforated plate 42 and are arranged axially in line with at least some of the flange holes 30 and therefore also with the channels of the tubes 20 and also with the adjacent ends of the bores 26 in the adaptor 6.

At both ends of the through-holes 46 of the perforated plate 42, there is respectively arranged an annular seal 48 or 50, which surrounds the through-hole 46 concerned.

The seals 48 on the rear plate side respectively lie or, when the line-connecting device is in the disassembled state, are arranged in such a way that they can be laid, in a sealing manner against a front end face 52 of a tube connecting socket 32.

The seals 50 on the front flange side respectively lie in a sealing manner against a rear end wall 54 of the adaptor 6 (FIG. 1), wherein each seal 50 in each case surrounds the end of one of the bores 26 formed in the adaptor 6 in a sealing manner.

The seals 48 and 50 are preferably inserted into annular depressions 49 and 51 in the perforated plate 42, from which depressions they axially protrude slightly out of the perforated plate 42, at least when the line-connecting device is in the disassembled state.

The perforated plate 42 is fastened in threaded bores 62 of the flange plate 10-2 by means of screws 60.

The flange plate 10-2 is fastened to the flange ring 10, for example by means of screws 66.

As shown in FIG. 2, the tubes 20 may be pulled out forwards through the flange holes 30, then provided with the tube connecting sockets 32 at their ends, and then pushed back into the robot arm 14 again, the flange connecting sockets 32 being inserted into the flange holes 30.

The invention claimed is:

1. A spray-gun line-connecting device for the connection of a multiplicity of flexible tubes to the end of a tubular robot arm, through which the tubes extend, with bores in an intermediate element, wherein the intermediate element is arranged in a mechanical connection between the robot arm and at least one automatic spray gun, wherein a robot flange is coupled to the end of the robot arm and comprises a multiplicity of flange holes, wherein each flange hole receives a tube connecting socket connected to the end of one of the tubes, each tube connecting socket has a radially protruding socket collar disposed against a front flange face, wherein a perforated plate is arranged between the robot flange and the intermediate element, wherein the perforated plate extends transversely over the tube connecting sockets and has a multiplicity of through-holes arranged in line with at least some of the flange holes, wherein each through-hole has an annular seal disposed in a depression at each end of the respective through-hole to surround the respective through-hole, wherein each annular seal on a rear plate side is configured to seal against an end face of one of the tube connecting sockets, wherein each annular seal on a front flange side is configured to seal against a rear end wall of the intermediate element around one of a multiplicity of intermediate element bores formed in the intermediate element, wherein the intermediate element bores are arranged in line with at least some of the through-holes of the perforated plate.

2. The spray-gun line-connecting device of claim 1, wherein the perforated plate is configured to removably couple to the robot flange.

3. The spray-gun line-connecting device of claim 1, wherein each of the socket collars has a circular outer circumference.

4. A system, comprising:
a spray-gun line connecting device, comprising:
a first mating surface comprising a plurality of recesses leading to a plurality of first passages, wherein each recess is cylindrical and has a recess diameter, each first passage has a first passage diameter, the first passage diameter is smaller than the recess diameter; and
a second mating surface configured to mate with the first mating surface to connect a plurality of lines between a robotic arm and a spray gun, wherein the second mating surface comprises a plurality of second passages and a plurality of first annular recesses, wherein each first annular recess is coaxial with one of the second passages, each first annular recess comprises a first annular seal, and each second passage has a second passage diameter smaller than the first passage diameter;
wherein the plurality of first passages are configured to receive the plurality of lines, each recess is configured to receive a cylindrical head of each line, each second passage is configured to align with a third passage inside each line, and the second mating surface is configured to secure each cylindrical head in the respective recess.

5. The system of claim 4, wherein the spray-gun line connecting device is configured to connect at least five lines between the robotic arm and the spray gun.

6. The system of claim 4, wherein the first mating surface is disposed on a perforated plate having the plurality of recesses and the plurality of first passages.

7. The system of claim 4, comprising the spray gun, wherein the first mating surface is disposed directly on the spray gun.

8. The system of claim 4, comprising the robotic arm, wherein the second mating surface is disposed directly on the robotic arm.

9. The system of claim 4, wherein the first mating surface is a cylindrical recess below an outer surface, and the second mating surface is disposed on a cylindrical structure that fits into the cylindrical recess.

10. The system of claim 9, wherein the cylindrical structure comprises a cylindrical pate having a thickness substantially equal to a depth of the cylindrical recess.

11. The system of claim 4, comprising a plate having the second mating surface and an opposite third mating surface, wherein the plurality of second passages extend through the plate from the second mating surface to the third mating surface, the third mating surface comprises a plurality of second annular recesses, each second annular recess is coaxial with one of the second passages, each second annular recess comprises a second annular seal.

12. The system of claim 4, comprising the plurality of lines.

13. A method, comprising:
connecting a plurality of lines between a spray gun and a robotic arm via a spray-gun line connecting device, wherein the spray-gun line connecting device comprises:
a first mating surface comprising a plurality of recesses leading to a plurality of first passages, wherein each recess is cylindrical and has a recess diameter, each first passage has a first passage diameter, the first passage diameter is smaller than the recess diameter; and a second mating surface configured to mate with the first mating surface to connect a plurality of lines between the robotic arm and the spray gun, wherein the second mating surface comprises a plurality of second passages and a plurality of first annular recesses, wherein each first annular recess is coaxial with one of the second passages, each first annular recess comprises a first annular seal, and each second passage has a second passage diameter smaller than the first passage diameter;

wherein the plurality of first passages are configured to receive the plurality of lines, each recess is configured to receive a cylindrical head of each line, each second passage is configured to align with a third passage inside each line, and the second mating surface is configured to secure each cylindrical head in the respective recess.

14. The method of claim 13, comprising connecting at least five lines between the robotic arm and the spray gun via the spray-gun line connecting device.

15. The method of claim 13, wherein the first mating surface is disposed on a perforated plate having the plurality of recesses and the plurality of first passages.

16. The method of claim 13, wherein the first mating surface is disposed directly on the spray gun.

17. The method of claim 13, wherein the second mating surface is disposed directly on the robotic arm.

18. The method of claim 13, wherein the first mating surface is a cylindrical recess below an outer surface, and the second mating surface is disposed on a cylindrical structure that fits into the cylindrical recess.

19. The method of claim 13, wherein the spray-gun line connecting device comprises a plate having the second mating surface and an opposite third mating surface, wherein the plurality of second passages extend through the plate from the second mating surface to the third mating surface, the third mating surface comprises a plurality of second annular recesses, each second annular recess is coaxial with one of the second passages, each second annular recess comprises a second annular seal.

* * * * *